United States Patent
Hiramoto (10) Patent No.: US 9,013,397 B2
(45) Date of Patent: Apr. 21, 2015

(54) PORTABLE TERMINAL DEVICE AND KEY ARRANGEMENT CONTROL METHOD

(75) Inventor: Tomohiro Hiramoto, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 365 days.

(21) Appl. No.: 13/128,734

(22) PCT Filed: Dec. 14, 2009

(86) PCT No.: PCT/JP2009/071082
§ 371 (c)(1),
(2), (4) Date: May 11, 2011

(87) PCT Pub. No.: WO2010/071188
PCT Pub. Date: Jun. 24, 2010

(65) Prior Publication Data
US 2011/0234487 A1 Sep. 29, 2011

(30) Foreign Application Priority Data
Dec. 16, 2008 (JP) ................. 2008-319604

(51) Int. Cl.
| | | |
|---|---|---|
| G06F 1/16 | (2006.01) | |
| G06F 3/0488 | (2013.01) | |
| H04M 1/725 | (2006.01) | |
| H04N 1/00 | (2006.01) | |
| H04M 1/02 | (2006.01) | |

(52) U.S. Cl.
CPC ............ *G06F 1/1613* (2013.01); *G06F 1/1626* (2013.01); *G06F 1/1684* (2013.01); *G06F 1/1692* (2013.01); *G06F 3/04886* (2013.01); G06F 2200/1614 (2013.01); G06F 2200/1637 (2013.01); H04M 1/0281 (2013.01); *H04M 1/72522* (2013.01); *H04M 2250/12* (2013.01); *H04M 2250/22* (2013.01);

(Continued)

(58) Field of Classification Search
CPC ....... G09G 5/00; G06F 1/1613; G06F 1/1684; G06F 1/1626; G06F 1/1692; G06F 3/04886; G06F 2200/1614; G06F 2200/1637; H04N 1/00413; H04N 1/00307; H04N 1/00384; H04M 1/72522; H04M 1/0281; H04M 2250/12; H04M 2250/22
USPC .................................................. 345/156, 173
See application file for complete search history.

(56) References Cited

U.S. PATENT DOCUMENTS

| | | | |
|---|---|---|---|
| 2002/0115469 A1* | 8/2002 | Rekimoto et al. ............ | 455/550 |
| 2007/0291177 A1* | 12/2007 | Lahoz et al. .................. | 348/571 |

(Continued)

FOREIGN PATENT DOCUMENTS

| | | | | |
|---|---|---|---|---|
| JP | 2008-27183 | A | 2/2008 | |
| JP | 2008027183 | * | 2/2008 | ............... G06F 3/41 |
| JP | 2008027183 | A | 2/2008 | |
| JP | 2008084144 | A | 4/2008 | |
| JP | 2008027183 | * | 7/2008 | |

OTHER PUBLICATIONS

International Search Report for PCT/JP2009/071082 mailed Jan. 26, 2010.

(Continued)

*Primary Examiner* — Towfiq Elahi (57) ABSTRACT

A hold position detection unit for detecting a position held by an operator's hand is provided in at least both side portions of a terminal main body. And a display screen of a key group displayed on an operation display part is changed based on hold data indicating the position held by the operator's hand that is detected by the hold position detection unit.

2 Claims, 8 Drawing Sheets

(52) U.S. Cl.
CPC ...... *H04N 1/00307* (2013.01); *H04N 1/00384* (2013.01); *H04N 1/00413* (2013.01)

(56) References Cited

U.S. PATENT DOCUMENTS

2009/0027330 A1* 1/2009 Aida ............................ 345/156
2010/0134423 A1* 6/2010 Brisebois et al. ............. 345/173

OTHER PUBLICATIONS

Japanese Office Action for JP Application No. 2010-543008 mailed on Jun. 18, 2013 with Partial English Translation.
Office action in counterpart Japanese patent application 2010-543008 (dated Sep. 19, 2013).
Office action in counterpart Chinese patent application 200980150513.8 (dated Aug. 1, 2013).

* cited by examiner

PORTABLE TERMINAL DEVICE AND KEY ARRANGEMENT CONTROL METHOD

This application is the National Phase of PCT/JP2009/071082, filed Dec. 14, 2009, which insists on priority based on Japanese Patent Application No. 2008-319604 filed on Dec. 16, 2008 and the disclosure of which is hereby incorporated in its entirety.

TECHNICAL FIELD

The present invention relates to a portable terminal device in which a key arrangement can be flexibly changed and determined according to a hold position at which a user holds a terminal main body and a key arrangement control method.

BACKGROUND ART

So far, as this kind of technology of the key arrangement for a portable terminal device, a portable terminal device described in Japanese Patent Application Laid-Open No. 2008-84144 is known.

In the portable terminal device described in Japanese Patent Application Laid-Open No. 2008-84144, a display part detects a continuously moving input using a touch panel that starts from one point in a display area of an operation key group displayed on the display part. After the detection, the one point corresponding to the starting point is designated as a fixed point, the starting point is moved according to the continuously moving input, and also, the display area of the operation key group is enlarged or reduced according to the movement of the starting point.

At the same time, a layout of the operation key group is changed by enlarging or reducing at least a part of the operation key group.

[PATENT DOCUMENT 1] Japanese Patent Application Laid-Open No. 2008-84144.

DISCLOSURE OF INVENTION

Problems to be Solved by the Invention

In the portable terminal device described in the above-mentioned Japanese Patent Application Laid-Open No. 2008-84144, a change in size such as enlargement or reduction of the display area of the operation key group can be achieved according to a data input status on the touch panel by an operator and whereby operability of a key can be improved.

However, in such portable terminal device, the change in size of the operation key group can be achieved by operating the operation key group on the touch panel or performing an additional operation such as drag operation by the operator step by step. Therefore, there is a problem on operability.

The present invention is made in view of the above-mentioned situation and provides a portable terminal device in which an operation key group can be quickly and easily changed without performing an additional operation by an operator and a key arrangement control method.

Means for Solving the Problems

In order to solve the above-mentioned problem, a portable terminal device include a hold position detection unit which provide in a terminal main body for detecting a position held by an operator's hand, an operation display part which display a key group operated by the operator, and a display control part which changes a display screen of the key group displayed on the operation display part based on hold data indicating the position held by the operator's hand that is detected by the hold position detection unit.

A key arrangement control method in a portable terminal device which has an operation display part for displaying a key group operated by an operator and in which various processes are performed based on operation of keys on the operation display part include a procedure for changing a display screen of the key group displayed on the operation display part based on an output from a hold position detection unit provided to a terminal main body for detecting a position held by an operator's hand.

Advantages of the Invention

In this invention, a hold position detection unit for detecting the position held by the operator's hand is provided on both side portions of the terminal main body and the display screen of the key group displayed on the operation display part is changed based on the hold data indicating the position held by the operator's hand that is detected by the hold position detection unit.

Therefore, the change in display screen indicating the operation key group can be automatically and correctly performed without performing the additional operation by the operator.

BRIEF DESCRIPTION OF THE DRAWINGS

FIG. 1 is an external view of a wireless portable terminal 100 of a first exemplary embodiment according to the present invention.

FIG. 3 is an external view of a wireless portable terminal 300 of a second exemplary embodiment according to the present invention.

FIG. 6 is a view showing a screen display of an operation display part 2.

FIG. 7 is a view showing a screen display of the operation display part 2.

FIG. 8 is a view showing a screen display of the operation display part 2 when a camera 7 is activated.

BEST MODE FOR CARRYING OUT THE INVENTION

An exemplary embodiment according to a portable terminal device and a key arrangement control method of the present invention will be described with reference to FIG. 1 to FIG. 8.

First Exemplary Embodiment

Figures 1A, 1B:
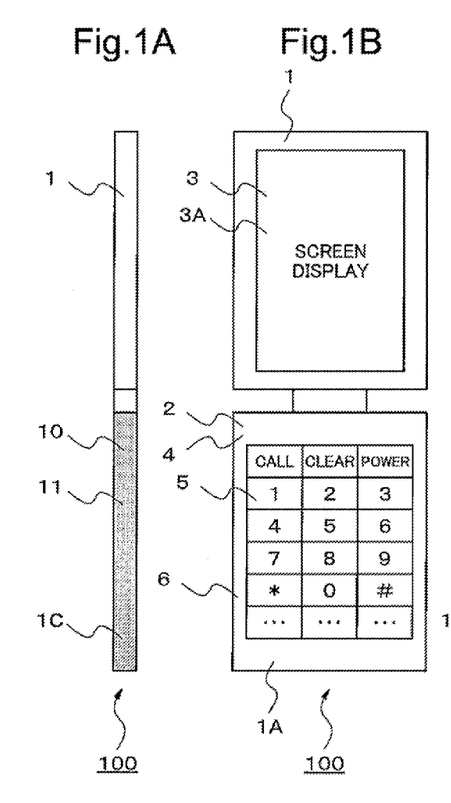
FIG. 1A is a left side view.
FIG. 1B is a front view.
Figure 1C:
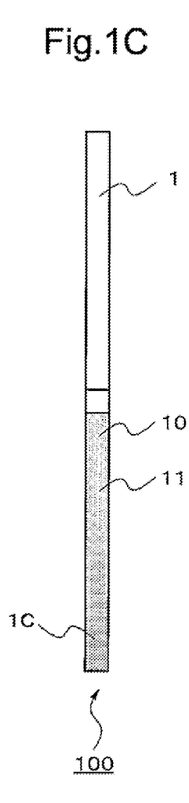
FIG. 1C is a right side view.
Figure 1D:
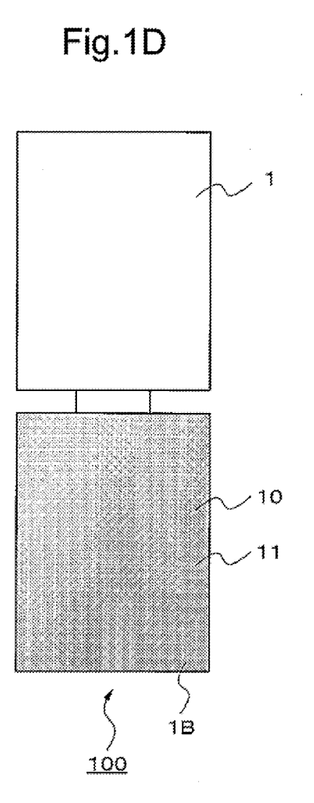
FIG. 1D is a rear view.

First, a first exemplary embodiment according to the present invention will be described. FIG. 1 is an external view of a wireless portable terminal 100 of the first exemplary embodiment according to the present invention, FIG. 1A is a left side view, FIG. 1B is a front view, FIG. 1C is a right side view, and FIG. 1D is a rear view.

In these figures, an operation display part 2 and a screen display part 3 are provided in a front portion 1A of a terminal main body indicated with a symbol of "1".

The operation display part 2 is input means having a key group 5 in which keys are arranged on a liquid crystal display 4 in a matrix shape and specifically, it is composed of a touch panel 6 which receives an input from the key group 5 in conjunction with the liquid crystal display 4.

The screen display part 3 displays the input data from the key group 5 of the operation display part 2 and also it is composed of a liquid crystal display 3A for displaying various modes.

Additionally, a hold position detection unit 10 for detecting the position held by the operator's hand is provided in both side portions 1C (refer to FIG. 1A and FIG. 1C) and a rear portion 1B (refer to FIG. 1D) of the terminal main body 1.

This hold position detection unit 10 is composed of a touch sensor 11. An area in which the operator holds the touch sensor 11 becomes an ON-state and an area in which the operator docs not hold the touch sensor 11 becomes an OFF-state.

A control part 20 (described later) determines a size of the operator's hand and whether the terminal main body 1 is held with a right hand/whether it is held with a left hand based on the ON/OFF area detected by the touch sensor 11.

Here, the touch sensor is a sensor for determining whether or not the operator touches both side portions and the rear portion of the terminal main body.

Figure 2:
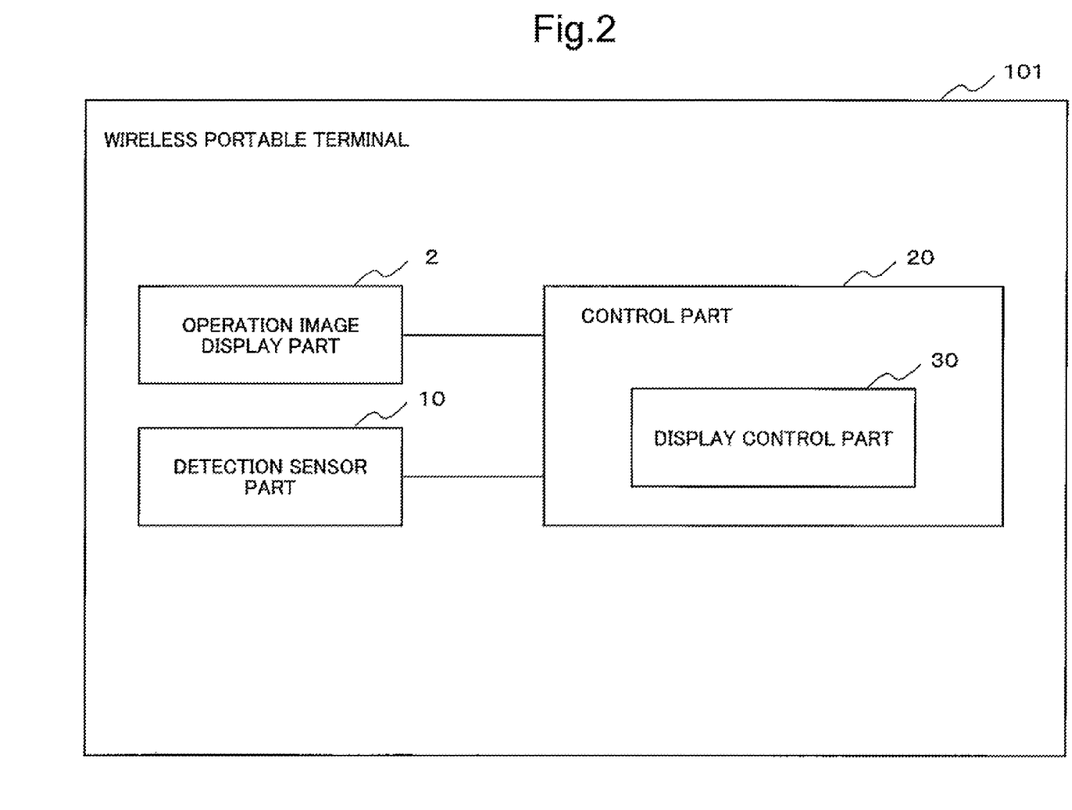
FIG. 2 is a block diagram showing a control device 101 of the wireless portable terminal 100.

FIG. 2 is a block diagram showing a control device 101 of the wireless portable terminal 100. An operation image display part 2 and a detection sensor part 10 including the hold position detection unit are connected to the control part indicated with a symbol of "20".

The control part 20 includes a display control part 30 of a key arrangement control device according to the present invention and the display control part 30 performs a process for changing a display position and a size of the key group 5 on the operation display part 2 based on the output from the detection sensor part 10 for detecting the position held by the operator's hand.

As described in detail above, in the wireless portable terminal 100 shown in this exemplary embodiment, the hold position detection unit for detecting the position held by the operator's hand is provided in both side portions of the terminal main body and the display screen of the key group displayed on the operation display part is changed based on the hold data indicating the position held by the operator's hand that is detected by the hold position detection unit.

Therefore, the change of the display screen displaying the operation key group can be automatically and correctly performed without performing the additional operation by the operator.

The Second Exemplary Embodiment

Next, a second exemplary embodiment according to the present invention will be described.

Figures 3A, 3B:
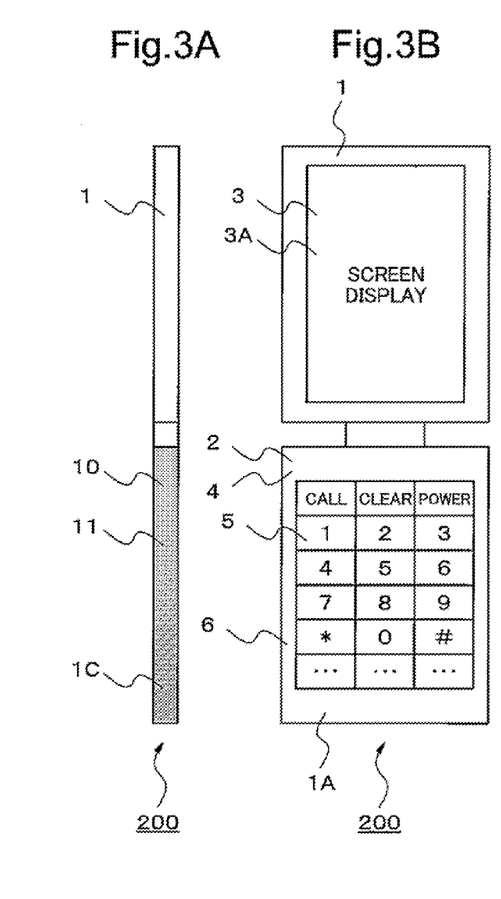
FIG. 3A is a left side view.
FIG. 3B is a front view.
Figure 3C:
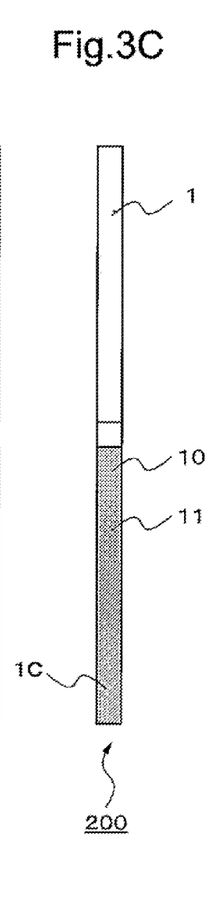
FIG. 3C is a right side view.
Figure 3D:
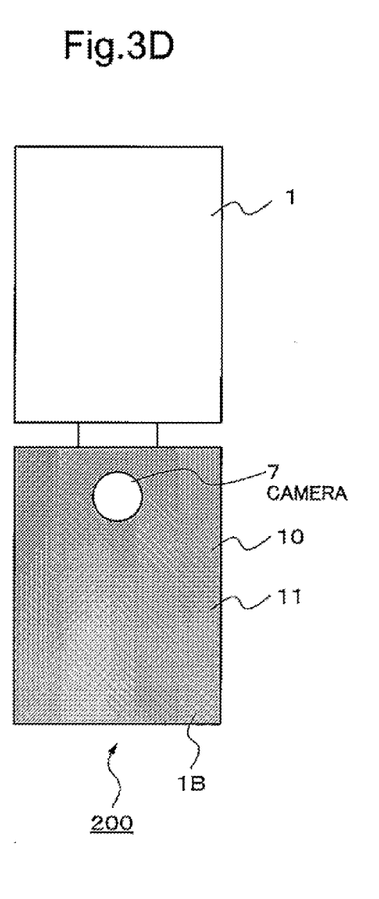
FIG. 3D is a rear view.

FIG. 3 is an external view of a wireless portable terminal 200 of the second exemplary embodiment according to the present invention, FIG. 3A is a left side view, FIG. 3B is a front view, FIG. 3C is a right side view, and FIG. 3D is a rear view.

In these figures, the operation display part 2 and the screen display part 3 are provided in the front portion 1A of the terminal main body indicated with a symbol of "1".

The operation display part 2 is input means having the key group 5 in which keys are arranged on the liquid crystal display 4 in a matrix shape and specifically, it is composed of the touch panel 6 which receives an input from the key group 5 in conjunction with the liquid crystal display 4.

The screen display part 3 displays input data from the key group 5 of the operation display part 2 and also it is composed of the liquid crystal display 3A for displaying various modes.

Meanwhile, a camera 7 shown in FIG. 3D is provided in the rear portion 1B of the terminal main body 1.

This camera 7 is located at the back side of the operation display part 2, and activated and stopped by an instruction from the key group 5 of the operation display part 2.

The hold position detection unit 10 for detecting the position held by the operator's hand is provided in both side portions 1C (refer to FIG. 3A and FIG. 3C) and the rear portion 1B (refer to FIG. 3D) of the terminal main body 1.

This hold position detection unit 10 is composed of the touch sensor 11. An area in which the operator holds the touch sensor 11 becomes an ON-state and an area in which the operator does not hold the touch sensor 11 becomes an OFF-state.

The control part 20 determines a size of the operator's hand and whether the terminal main body 1 is held with a right hand/whether it is held with a left hand based on the ON/OFF area detected by the touch sensor 11.

Figure 4:
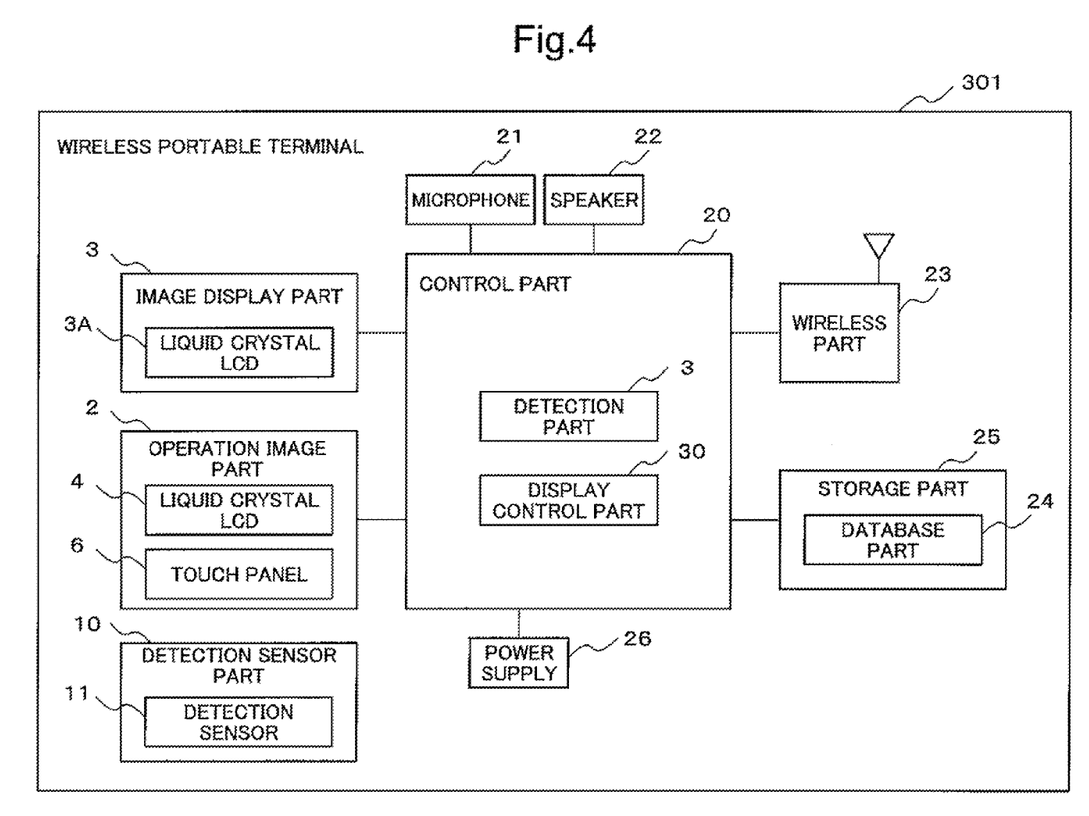
FIG. 4 is a block diagram showing a control device 301 of the wireless portable terminal 300.

FIG. 4 is a block diagram showing a control device 301 of a wireless portable terminal 300. The operation display part 2, the screen display part 3, the hold position detection unit 10, a microphone 21, a speaker 22, a wireless part 23 for performing communication, a storage part 25 including a database part 24, a power supply 26, and the like are connected to the control part indicated with a symbol of "20".

The control part 20 includes the display control part 30 of the key arrangement control device according to the present invention and in the display control part 30, a process for changing the display position and the size of the key group 5 on the operation display part 2 is performed based on the output from the hold position detection unit 10 for detecting the position held by the operator's hand.

The control procedure of this display control part 30 will be described with reference to FIG. 5.

Figure 5:
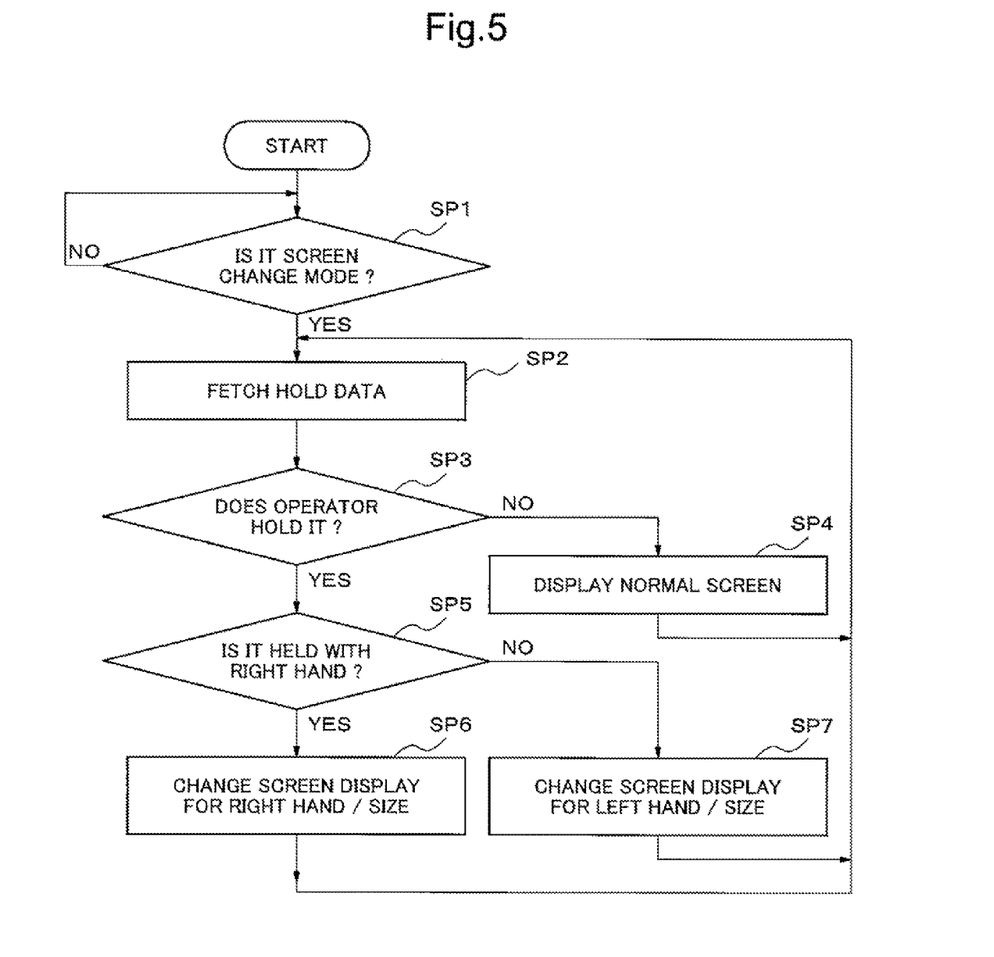
FIG. 5 is a flowchart showing a control procedure of a display control part 30.

Further, the process shown in FIG. 5 and the display screen for various modes that is displayed on the operation display part 2 are stored in the database part 24 of the storage part 25 in advance.

First, in step 1 (SP1), in the operation display part 2, it is determined whether a "normal screen mode" in which the position and the size of the display screen are not changed is selected and whether a "screen change mode" in which the position and the size of the display screen are changed is selected. When the "screen change mode" is selected, namely, the decision in step 1 is "Yes", the process advances to next step 2.

Further, the selection of the "normal screen mode" or the "screen change mode" is performed in a mode selection screen displayed on the operation display part 2.

Next, in step 2 (SP2), the hold data which indicates the ON state when the operator holds the touch sensor 11 and the OFF state when the operator does not hold it is fetched from the hold position detection unit 10.

In next step 3 (SP3), it is determined whether or not the operator holds the wireless portable terminal 100 at present by fetching the hold data in step 2. In case of the NO state in which the operator docs not hold the touch sensor 11, the process advances to next step 4 (SP4) and in case of the YES state in which the operator holds the touch sensor 11, the process advances to next step 5 (SP5).

Figure 6A:
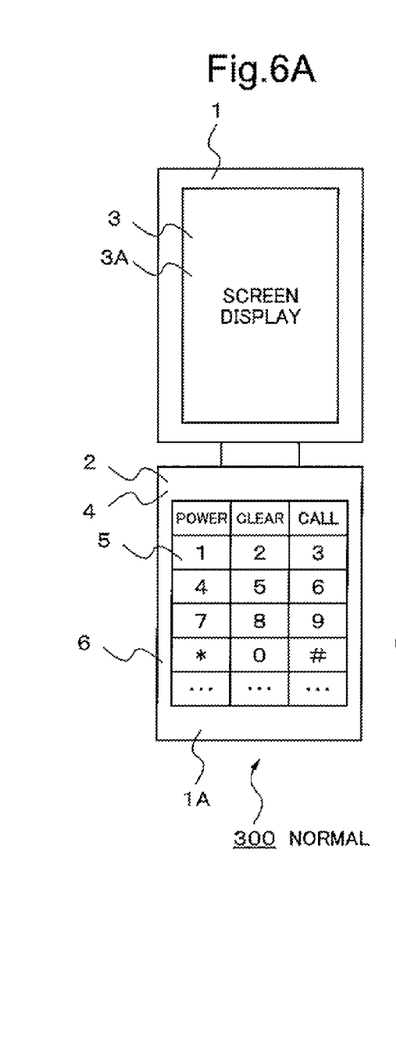
FIG. 6A shows a normal screen.

In Step 4, it is determined that the wireless portable terminal 300 has not yet been held by the operator and the screen displayed on the operation display part 2 is set to a normal screen which is the same as that in the "normal screen mode" shown in FIG. 6A and whose position and size are not changed.

In step 5 (SP5), it is determined whether the touch sensor 11 is held with the operator's right hand and whether the touch sensor 11 is held with the operator's left hand based on ON/OFF data indicated by the hold data fetched in step 2. When the touch sensor 11 is held with the operator's right hand, the process advances to step 6 (SP6) and when the touch sensor 11 is held with the operator's left hand, the process advances to step 7 (SP7).

Further, in this step 5 (SP5), when the ON area of the touch sensor 11 located in the right side portion 1C is greater than the ON area of the touch sensor 11 located in the left side portion 1C among the touch sensors 11 (the hold position detection unit 10) that are provided in both side portions 1C of the terminal main body 1, it is determined that the operator holds the touch sensor 11 with the right hand and when the ON area of a touch sensor 1 located in the left side portion 1C is greater than the ON area of the touch sensor 11 located in the right side portion 1C, it is determined that the operator holds the touch sensor 11 with the left hand.

As a criterion for determining whether the operator holds it with the right hand and whether the operator holds it with the left hand, a criterion in which a plurality of hold patterns when the touch sensor 11 is held with the left hand and the right hand are prepared in advance and it is determined whether the operator holds it with the right hand and whether the operator holds it with the left based on the coincidence between the pattern obtained by using the touch sensor 11 located in both side portions IC and/or the rear portion 1B and these prepared hold patterns may be used instead of the above-mentioned criterion in which the determination is performed based on the magnitude relation between the ON area of the touch sensor 11 located in one of the side portions 1C and the ON area of the touch sensor 11 located in the other of the side portions 1C.

Figures 6B, 6C:
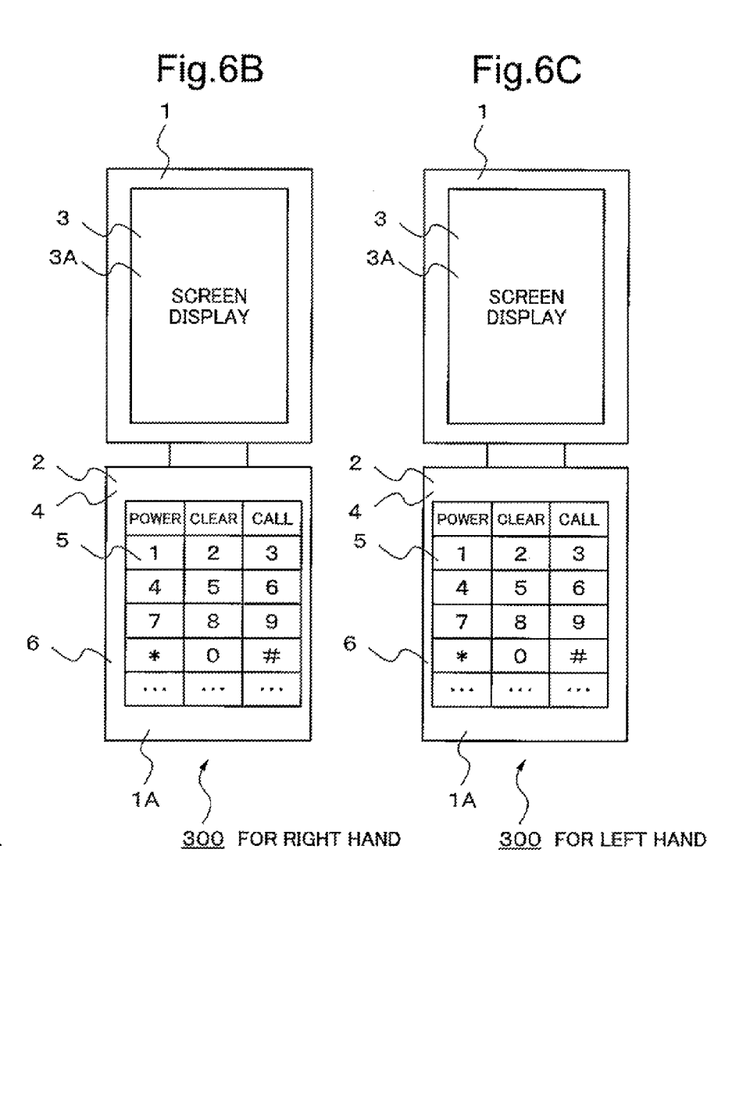
FIG. 6B shows a screen for right hand.
FIG. 6C shows a screen for left hand.

In step 6 (SP6), a display screen for right hand shown in FIG. 6B that is stored in advance is displayed on the operation display part 2 based on the result determined in step 5.

The display screen for right hand is placed in the right side of the operation display par 2 although the normal screen is placed in the center position that is a reference position (refer to FIG. 6A) in order to facilitate the operation of keys with the right hand in the operation display part 2.

Figure 7A:
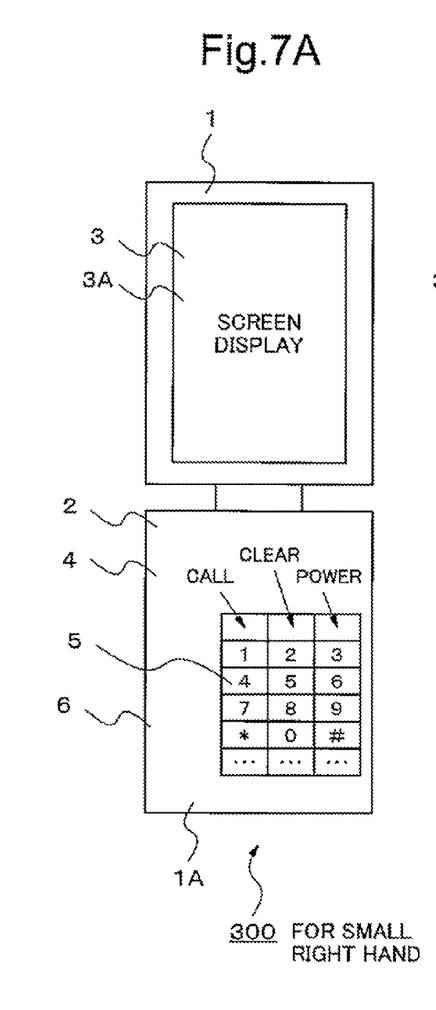
FIG. 7A shows a screen for right hand of an operator with a small hand.

Additionally, when it is determined that a range of the ON area of the touch sensor 11 held with the operator's right hand that is located in the (right) side portion 1C and a range of the ON area of the touch sensor 11 held with the operator's right hand that is located in the rear portion 1B are smaller than a predetermined and specified range based on the hold data fetched in step 2, the display screen is changed to a display screen for right hand shown in FIG. 7A that is smaller than the display screen shown in FIG. 6B.

In step 7 (SP7), the display screen for left hand as shown in FIG. 6C that is stored in advance is displayed on the operation display part 2 based on the result determined in step 5.

The display screen for left hand is placed in the left side of the operation display part 2 although the normal screen is placed in the center position that is the reference position (refer to FIG. 6A) in order to facilitate the operation of keys with the left hand in the operation display part 2.

Figure 7B:
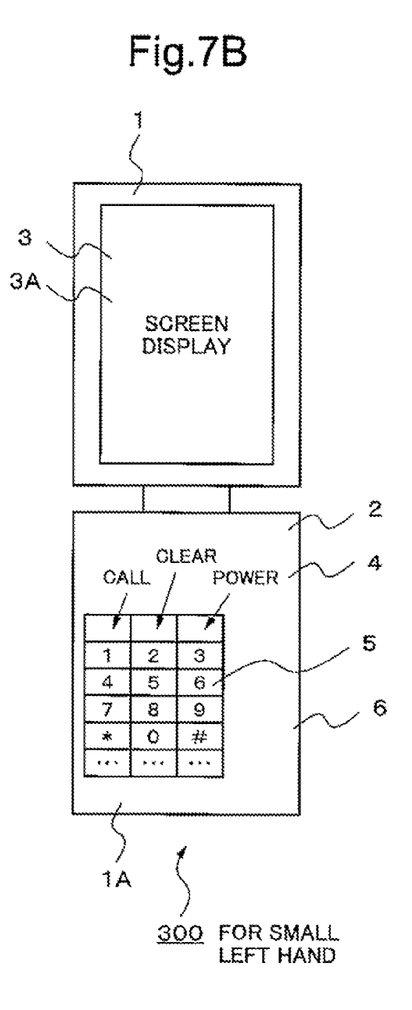
FIG. 7B shows a screen for left hand of an operator with a small hand.

Additionally, when it is determined that the range of the ON area of the touch sensor 11 held with the operator's left hand that is located in the (left) side portion 1C and the range of the ON area of the touch sensor 11 held with the operator's left hand that is located in the rear portion 1B are smaller than the predetermined and specified range based on the hold data fetched in step 2, the display screen is changed to a display screen for left hand shown in FIG. 7B that is smaller than the display screen shown in FIG. 6C.

Further, when the camera 7 is activated, as shown in FIG. 7A to FIG. 7C, it is desirable that the display screen of the operation display part 2 is placed in a position lower than an embedded position 7A at which the camera 7 placed in the rear portion 1B of the terminal main body 1 is embedded so that the display screen is located apart from the embedded position 7A.

Figures 8A, 8B:
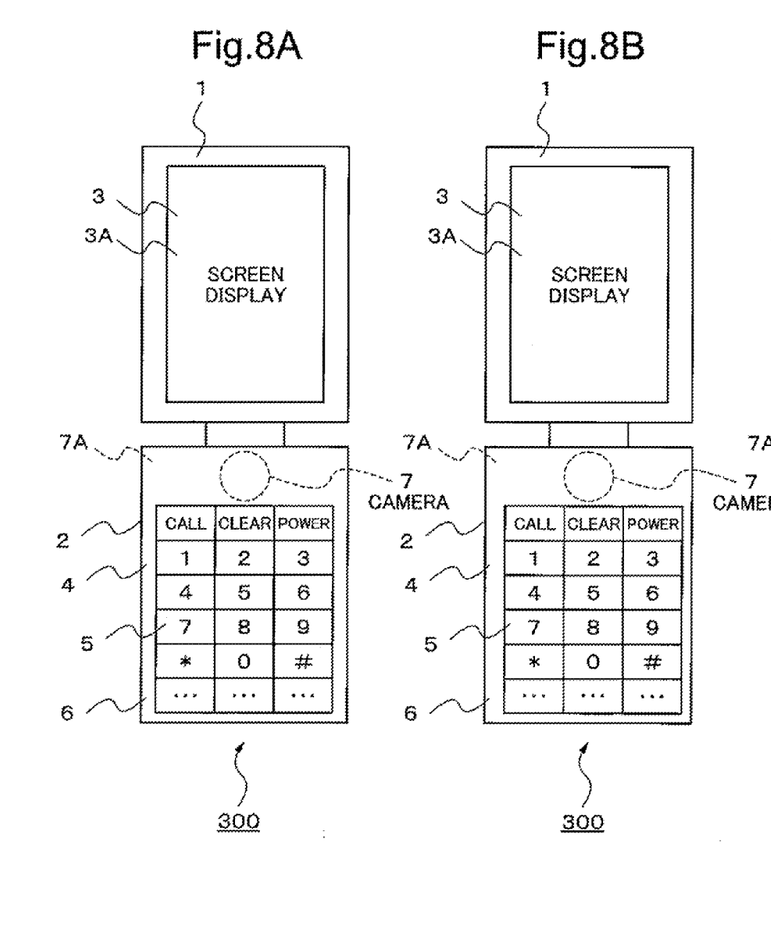
FIG. 8A shows a normal screen.
FIG. 8B shows a screen for right hand.
Figure 8C:
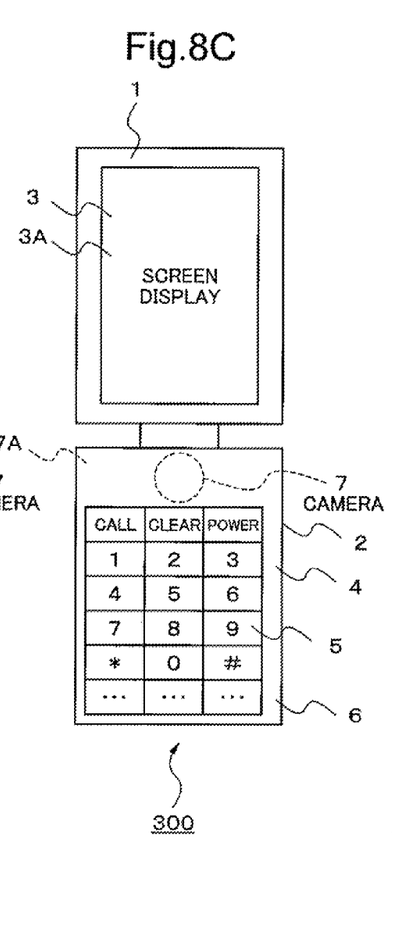
FIG. 8C shows a screen for left hand.

Namely, in case of the normal screen shown in FIG. 6A, the normal screen is displayed as shown in FIG. 8A. In case of the display screen for right hand shown in FIG. 6B, the display screen for right hand is displayed as shown in FIG. 8B. In case of the display screen for left hand shown in FIG. 6C, the display screen for left hand is displayed as shown in FIG. 8C.

By performing such changes in screen display, the wireless portable terminal 100 with which a photograph can be taken without a trouble in which the camera 7 is covered with the operator's hand when the operator operates the key group 5 and which has good operability can be obtained.

As described in detail above, in the wireless portable terminal 300 described in the exemplary embodiment, the hold position detection unit 10 for detecting the position held by the operator's hand is provided in both side portions 1C and the rear portion 1B of the terminal main body 1 and the display screen of the key group 5 displayed on the operation display part 2 is changed based on the hold data indicating the position held by the operator's hand that is detected by the hold position detection unit 10.

By the hold position detection unit 10 provided in at least both side portions of the terminal main body 1 for detecting the position held by the operator's hand, the situation in which the operator holds the portable terminal, such as whether the operator's hand is small, whether the terminal main body 1 is held with a right hand/whether the terminal main body 1 is held with a left hand, and the like, can be grasped correctly.

As a result, the display screen displaying the key group 5 can be automatically and correctly changed without operating the key group 5 on the touch panel 6 or performing an additional operation such as drag or the like by the operator step by step.

Additionally, in the above-mentioned wireless portable terminal 300, the camera 7 is arranged on the rear surface of the terminal main body 1. When the camera 7 is activated, the position of the display screen of the key group 5 that is displayed on the operation display part 2 is changed so that the display screen is located apart from the position of the camera.

Consequently, a photograph can be taken without a trouble in which the camera is covered with the operator's hand when the operator operates the key group 5 and operability of the wireless portable terminal can be improved in this respect.

Further, in the above-mentioned exemplary embodiment, one small-sized display screen for right hand shown in FIG. 7A and one small-sized display screen for left hand shown FIG. 7B are prepared. However, a method in which a plurality of display screens are stored according to the size of the operator's hand in advance and the display screen is changed in a multistage manner according to the range of the ON area of the touch sensor 11 held by the operator may be used.

Furthermore, a configuration in which according to the situation, the display screen is changed only from the normal screen shown in FIG. 6A to the display screen for right hand shown in FIG. 6B or the display screen for left hand shown in FIG. 6C and it is not changed to the small-sized display screen as shown in FIG. 7A and FIG. 7B may be used.

In order to precisely detect a state held by the operator, the touch sensor 11 of the hold position detection unit 10 is provided in both side portions 1C and the rear portion 1B of the terminal main body 1. However, it is not essential to provide the touch sensor 11 in the rear portion 1B of the terminal main body 1 for detecting whether the operator holds it with the right hand, whether the operator holds it with the left, and whether or not the operator' hand is small and it may be arbitrarily deleted.

The exemplary embodiment of the present invention has been described in detail above with reference to the drawings. However, a specific configuration is not limited to this exemplary embodiment and design change or the like can be made without departing from the gist of the present invention.

This application insists on priority based on Japanese Patent Application No. 2008-319604 filed on Dec. 16, 2008 and the disclosure of which is hereby incorporated in its entirety.

INDUSTRIAL APPLICABILITY

The present invention can be applied to a portable terminal and a portable device in which operation is performed by using a touch panel.

DESCRIPTION OF SYMBOL 1 terminal main body
1C side portion
2 operation display part
5 key group
7 camera
10 hold position detection unit
30 display control part
100, 200, 300 wireless portable terminal

The invention claimed is:

1. A method comprising:
  determining, by a portable terminal device, whether a user has caused the portable terminal device having a display screen and a touchscreen separate from the display screen on which a keypad is displayed to enter a screen change mode in which a position and a size of the keypad on the touchscreen is changed; and
  in response to determining that the user has caused the portable terminal device to enter the screen change mode, performing:
    retrieving, by the portable terminal device, hold data, the hold data comprising an extent to which the user is in contact with a first side of the portable terminal device and an extent to which the user is in contact with a second side of the portable terminal device opposite the first side;
    determining, by the portable terminal device, whether the hold data indicates the user is in contact with one or more of the first side and the second side;
    in response to determining that the hold data indicates the user is not in contact with the one or more of the first side and the second side, displaying, by the portable terminal device, the keypad in full size such that the keypad takes up the touchscreen in entirety; and
  in response to determining that the hold data indicates that the user is in contact with the one or more of the first side and the second side, performing:
    determining, by the portable terminal device, whether the hold data indicates the user is holding the portable terminal device in a right hand of the user;
    in response to determining that the hold data indicates the user is holding the portable terminal device in the right hand, displaying the keypad on the touchscreen such that the keypad is oriented towards a right-bottom corner of the touchscreen, and such that the size of the keyboard is according to the extent to which the user is in contact with the first side and the extent to which the user is in contact with the second side, the size of the keypad being such that the keypad does not take up the touchscreen in entirety, the size of the keypad being such that a thumb of the right hand of the user is able to reach an upper-left corner of the keypad due to the size of the keypad being reduced in size, the upper-left corner being a right angle, where the size of the keypad is larger where the user is more in contact with the one or more of the first side and the second side and the size of the keypad is smaller compared to the larger size where the user is less in contact with the one or more of the first side and the second side; and
    in response to determining that the hold indicates the user is not holding the portable terminal device in the right hand, concluding that the user is holding the portable terminal device in a left hand of the user, displaying the keypad on the touchscreen such that the keypad is oriented towards a left-bottom corner of the touchscreen, and such that the size of the keyboard is according to the extent to which the user is in contact with the first side and the extent to which the user is in contact with the second side, the size of the keypad being such that the keypad does not take up the touchscreen in entirety, the size of the keypad being such that a thumb of the left hand of the user is able to reach an upper-right corner of the keypad due to the size of the keypad being reduced in size, the upper-right corner being a right angle, where the size of the keypad is larger where the user is more in contact with the one or more of the first side and the second side and such that the size of the keypad is smaller compared to the larger size where the user is less in contact with the one or more of the first side and the second side.

2. A portable terminal device comprising:
a housing having a top part and a bottom part;
a display screen within the top part of the housing;
a touchscreen within the bottom part of the housing and on which a keypad is displayed;
a hardware detection mechanism at a first side and at a second side of the bottom part of the housing to detect hold data comprising an extent to which a user is in contact with the first side and an extent to which the user is in contact with the second side; and
a display control mechanism to, responsive to the user invoking a screen change mode in which a position and a size of the keypad on the touchscreen is changed:
  determine whether the hold data indicates the user is in contact with one or more of the first side and the second side;
  in response to determining that the hold data indicates the user is not in contact with the one or more of the first side and the second side, display the keypad in full size such that the keypad takes up the touchscreen in entirety; and in response to determining that the hold data indicates that the user is in contact with the one or more of the first side and the second side:

determine whether the hold data indicates the user is holding the portable terminal device in a right hand of the user;

in response to determining that the hold data indicates the user is holding the portable terminal device in the right hand, display the keypad on the touchscreen such that the keypad is oriented towards a right-bottom corner of the touchscreen, and such that the keypad has a size according to the extent to which the user is in contact with the first side and the extent to which the user is in contact with the second side, the size of the keypad being such that the keypad does not take up the touchscreen in entirety, the size of the keypad being such that a thumb of the right hand of the user is able to reach an upper-left corner of the keypad due to the size of the keypad being reduced in size, the upper-left corner being a right angle, where the size of the keypad is larger where the user is more in contact with the one or more of the first side and the second side and the size of the keypad is smaller compared to the larger size where the user is less in contact with the one or more of the first side and the second side; and in response to determining that the hold indicates the user is not holding the portable terminal device in the right hand, conclude that the user is holding the portable terminal device in a left hand of the user, and display the keypad on the touchscreen such that the keypad is oriented towards a left-bottom corner of the touchscreen, and such that the keypad has the size according to the extent to which the user is in contact with the first side and the extent to which the user is in contact with the second side, the size of the keypad being such that the keypad does not take up the touchscreen in entirety, the size of the keypad being such that a thumb of the left hand of the user is able to reach an upper-right corner of the keypad due to the size of the keypad being reduced in size, the upper-right corner being a right angle, where the size of the keypad is larger where the user is more in contact with the one or more of the first side and the second side and such that the size of the keypad is smaller compared to the larger size where the user is less in contact with the one or more of the first side and the second side.

* * * * *